US011995232B1

United States Patent
Maschmeyer et al.

(10) Patent No.: US 11,995,232 B1
(45) Date of Patent: May 28, 2024

(54) SYSTEMS AND METHODS FOR RESPONSIVE USER INTERFACE BASED ON GAZE DEPTH

(71) Applicant: SHOPIFY INC., Ottawa (CA)

(72) Inventors: Russ Maschmeyer, Berkeley, CA (US); Eric Andrew Florenzano, San Francisco, CA (US); Brennan Letkeman, Calgary (CA); Diego Macario Bello, Montreal (CA); Daniel Beauchamp, Toronto (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 18/108,334

(22) Filed: Feb. 10, 2023

Related U.S. Application Data

(60) Provisional application No. 63/431,477, filed on Dec. 9, 2022.

(51) Int. Cl.
*G06F 3/01* (2006.01)
*G06F 3/04845* (2022.01)

(52) U.S. Cl.
CPC .......... *G06F 3/013* (2013.01); *G06F 3/04845* (2013.01); *G06F 2203/04804* (2013.01)

(58) Field of Classification Search
CPC ....................................................... G06F 3/013
USPC ....................................................... 345/156
See application file for complete search history.

(56) References Cited

U.S. PATENT DOCUMENTS

| 7,572,008 | B2 | 8/2009 | Elvesjo et al. |
| 9,800,864 | B2 * | 10/2017 | Aronsson ............. H04N 13/383 |
| 11,170,521 | B1 | 11/2021 | Ben Himane et al. |
| 2013/0187835 | A1 * | 7/2013 | Vaught ................... G06F 3/011 |
| | | | 345/7 |
| 2015/0049201 | A1 | 2/2015 | Liu et al. |
| 2017/0196451 | A1 | 7/2017 | Tian |
| 2017/0316611 | A1 | 11/2017 | SanGiovanni et al. |
| 2021/0048938 | A1 | 2/2021 | Scott, II et al. |
| 2021/0232288 | A1 | 7/2021 | Deliz Centeno et al. |

OTHER PUBLICATIONS

"How do Tobii eye trackers work?" Tobii. Knowledge article. Published Sep. 10, 2021, but accessed Dec. 16, 2022. 2 pages. Accessible from https://connect.tobii.com/s/article/How-do-Tobii-eye-trackers-work?language=en_US.
"Eye tracking". Wikipedia. Published on Dec. 11, 2022, but accessed on Dec. 15, 2022. 23 pages. Accessible from https://en.wikipedia.org/wiki/Eye_tracking.

* cited by examiner

*Primary Examiner* — Long D Pham

(57) ABSTRACT

In virtual reality (VR) and augmented reality (AR), eye tracking may be performed to determine the user's gaze direction. The gaze direction may be used to enhance user interaction. However, when a user gazes in a particular direction, it could sometimes be the case that there are multiple items located in that gaze direction, each at a different depth. The gaze of direction alone might not be indicative of the item at which the user is looking. Therefore, in some embodiments, to try to further enhance user interaction, a gaze depth of the gaze may be determined. Some embodiments are directed to performing eye tracking to detect a gaze depth of a human's gaze and modifying a user interface (UI) responsive to a change in the gaze depth.

21 Claims, 17 Drawing Sheets

| E-Commerce Platform | Q Search | JG John's Apparel / Jonny B. Good |

- Home
- Orders
- Products
- Customers
- Reports
- Discounts
- Apps

SALES CHANNELS ⊕
- Online Store
- Mobile App
- View all channels

⚙ Settings

Good afternoon, Jonny B..
Here's what's happening with your store today.

Today's total sales   Today's visits
$98.00                1

● Update your Platform Payments tax details
We require additional information to verify your identity.
[Update tax details]

● Advanced Cash on Delivery has been deactivated for your store
[See why]

All channels ˅        Today ˅

TOTAL SALES
$98.00

$125
$75
$25
         12am   8pm   4pm   11pm
                              Jun 1
                              2 orders TOTAL SALES BY CHANNEL        View dashboard
                              Jun 1
Online Store                  0 orders
$0.00

Mobile app                    0 orders
$0.00

Shopify POS (126 York St.)    0 orders
$0.00

FIG. 16

SYSTEMS AND METHODS FOR RESPONSIVE USER INTERFACE BASED ON GAZE DEPTH

CROSS-REFERENCE TO RELATED APPLICATION

The present application claims the benefit under 35 U.S.C. § 119(e) of U.S. Provisional Patent Application Ser. No. 63/431,477 filed on Dec. 9, 2022, which is incorporated herein by reference.

FIELD

The present application relates to eye tracking and presentation of a user interface (UI) in virtual reality (VR) or augmented reality (AR).

BACKGROUND

In virtual reality (VR) and augmented reality (AR) a user looks at a view having virtual content. In the case of VR, the view itself may be of a virtual space and therefore made up of only virtual content. In the case of AR, the view may be of real-world space augmented with virtual content. In some applications, a human may wear a head-mounted display (HMD) and view either a virtual world (in the case of VR) or a real-world space that is augmented with virtual content (in the case of AR). AR, as used herein, encompasses mixed-reality (MR).

Eye tracking may be performed to determine the user's gaze direction. The gaze direction may be used to enhance user interaction. For example, if the eye tracking indicates that the user's gaze is in the direction of a particular object, the system may react to enhance the level of interaction with that object. As an example, if the user is looking towards a virtual character rendered on the display, the virtual character may change its facial expression.

SUMMARY

The view may provide an illusion of 3D by creating depth perception. Alternatively, or additionally, the view may be or include a view of real-world space, e.g. if the real-world is being augmented with virtual content. Therefore, when a user gazes in a particular direction, it could sometimes be the case that there are multiple items located in that gaze direction, each at a different actual or perceived depth. The gaze of direction alone might not be indicative of the item at which the user is looking. Therefore, in some embodiments, to try to further enhance user interaction, a gaze depth of the gaze may be determined, and the system may react accordingly.

Some embodiments are directed to performing eye tracking to detect a gaze depth of a human's gaze and modifying a user interface (UI) responsive to a change in the gaze depth. The term "depth" here refers to how far from the human a point of convergence for the human's left and right eyes is, and may alternatively be called a distance (or "depth") of focus in this application. The term "focus" or "focusing", as used in this application, refers to the human's selective placement of the point of convergence of the human's left and right eyes. While the skilled person may recognize that there is a natural tendency for human eyes to continually re-focus on the point of convergence (i.e. in the sense of reshaping each eye's lenses to make objects apparently at and around the point of convergence appear sharper), this particular notion of re-focusing (i.e. of lenses) is not specifically what is meant by "focus" or "focusing" in this application. Put another way, in this application, a depth or distance of "focus" or "focusing" refers to the depth/distance at which the human has directed his or her point of convergence, e.g., when viewing something located at that depth/distance. The item being viewed might not literally be at that physical depth/distance from the human's eyes, e.g. it might be rendered on a display right in front of the human's eyes. However, due to the actual or illusion of 3D space (e.g. rendered on the display), the human perceives the item to be at the depth/distance at which the human's gaze is focused.

In some embodiments, a computer-implemented method includes generating a UI for presentation on a display. The UI may be overlaid onto a view. The view may be rendered on the display, or the display may be transparent (e.g. smart glasses) and the view seen through the display. The method may include performing eye tracking to detect a gaze depth of a gaze of a human. The method may further include modifying the UI responsive to a change in the gaze depth.

In some embodiments, at least part of the UI may be semi-transparent to show both the UI and at least part of the view over which the UI is overlaid.

In some embodiments, modifying the UI responsive to the change in gaze depth includes modifying the UI to be less visually prominent responsive to the gaze depth increasing. Modifying the UI to be less visually prominent may include at least one of: increasing transparency of the UI; reducing a size of the UI; moving the UI; moving content on the UI; or reducing an amount or size of content on the UI.

In some embodiments, the computer-implemented method may include displaying a visual focusing aid associated with a decreased gaze depth, and modifying the UI to be more visually prominent responsive to the gaze depth subsequently changing to the decreased gaze depth associated with the focusing aid.

In some embodiments, modifying the UI responsive to the change in gaze depth includes modifying the UI to be more visually prominent responsive to the gaze depth decreasing. Modifying the UI to be more visually prominent may include at least one of: decreasing transparency of the UI; enlarging a size of the UI; moving the UI; moving content on the UI; or increasing an amount or size of content on the UI.

In some embodiments, the computer-implemented method may further include modifying at least part of the view to make the view less visually prominent.

In some embodiments, modifying the UI responsive to the change in gaze depth includes modifying the UI to be less visually prominent responsive to the gaze depth increasing and modifying the UI to be more visually prominent responsive to the gaze depth decreasing.

In some embodiments, modifying the UI responsive to the change in gaze depth includes changing content displayed on the UI. In some embodiments, the changed content may also be based on a direction of the gaze.

In some embodiments, the computer-implemented method may include: determining a direction of gaze; determining, based on the gaze depth and the direction of gaze, that the human is viewing a particular item; and responsive to the determining that the human is viewing the particular item, modifying the UI.

In some embodiments, the gaze depth that is detected before the change in the gaze depth is an initial gaze depth, and modifying the UI responsive to the change in the gaze depth may include: determining a duration of time during which the gaze depth remains changed compared to the initial gaze depth; and modifying the UI responsive to the duration of time exceeding a threshold.

In some embodiments, detecting the gaze depth of the gaze includes: determining a first vector representing a gaze direction of a left eye; determining a second vector representing a gaze direction of a right eye; and determining the gaze depth based on convergence of the first vector and the second vector.

A system is also disclosed that is configured to perform the methods disclosed herein. For example, the system may include at least one processor to directly perform (or control/instruct the system to perform) the method steps. In some embodiments, the system includes at least one processor and a memory storing processor-executable instructions that, when executed, cause the at least one processor to perform any of the methods described herein.

In some embodiments, there is provided a computer-readable storage medium having stored thereon computer-executable instructions that, when executed by at least one processor, cause the at least one processor to perform any of the methods disclosed herein. The computer-readable storage medium may be non-transitory.

BRIEF DESCRIPTION OF THE DRAWINGS

Embodiments will be described, by way of example only, with reference to the accompanying figures wherein:

FIG. 16 depicts an embodiment for a home page of an administrator; and

DETAILED DESCRIPTION

For illustrative purposes, specific embodiments will now be explained in greater detail below in conjunction with the figures.

Figure 1:
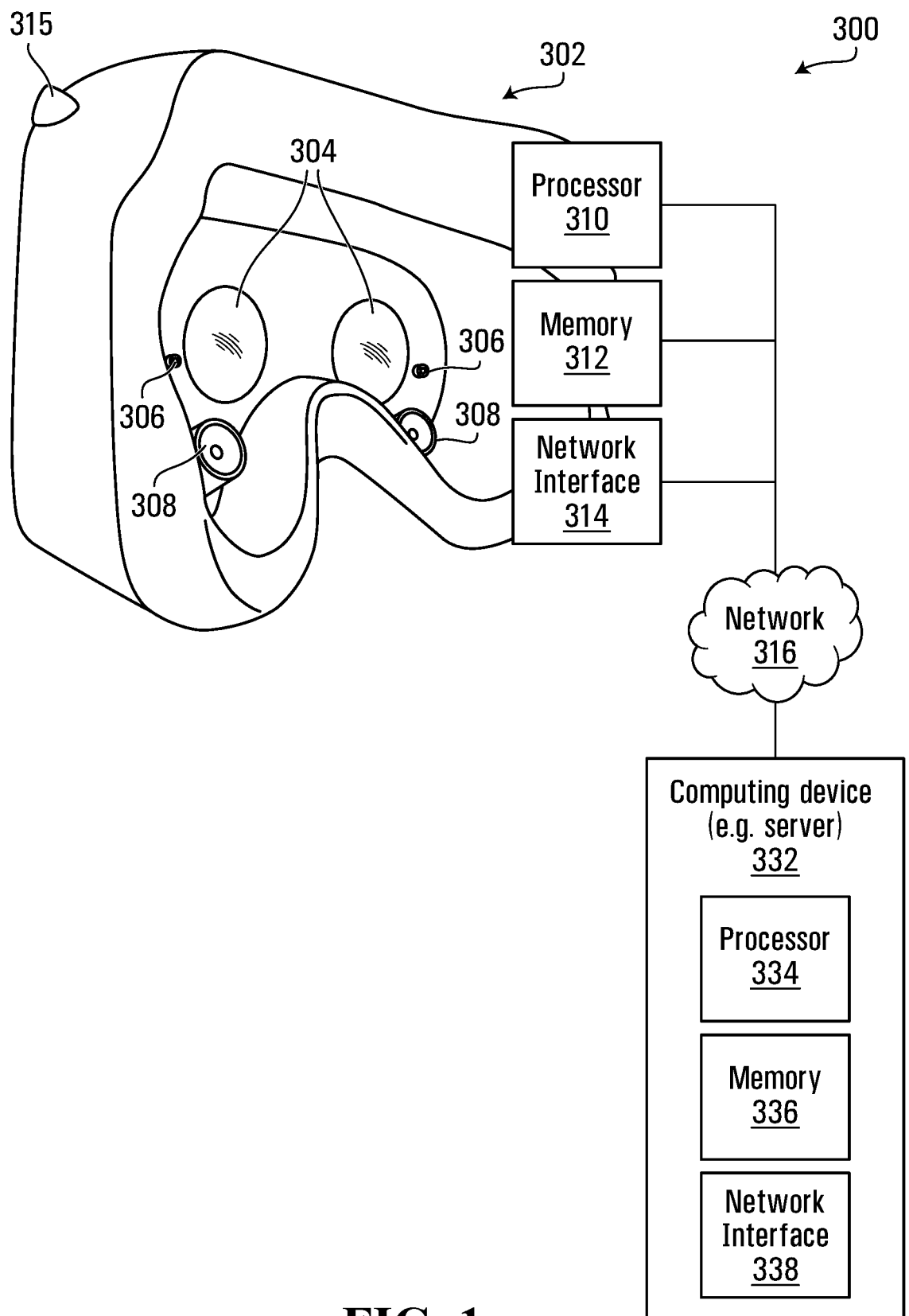
FIG. 1 illustrates a system for implementing a responsive user interface (UI) based on gaze depth, according to some embodiments.

FIG. 1 illustrates a system 300 for implementing a responsive user interface (UI) based on gaze depth, according to some embodiments. The system 300 includes a display device 302 having a computer integrated or housed therein. The display device 302 presents virtual content, such as a UI, overlaid onto a view.

The display device 302 is illustrated as a head-mounted display (HMD). A HMD, as used herein, includes any display device meant to move with the head, e.g. a display device that is wearable and/or a display mounted to a device (such as a helmet) that is wearable. A HMD encompasses mobile or smartphone headsets, such as mobile VR headsets in which a mobile phone sits inside the housing of the headset. A HMD also encompasses optical HMDs and/or see-through HMDs, such as smart glasses, e.g. where virtual content is projected onto a lens. In the case of optical and/or see-through HMDs, the virtual content may be overlaid onto the view by projecting that content onto a surface (such as a glass or lens) through which a human is viewing. The surface (e.g. lens) may be considered the display because it is the surface on which the virtual content (e.g. UI) is presented for display. The display may be called a transparent display.

Moreover, although the display device 302 is illustrated as a HMD, the display device 302 is not limited to a HMD. For example, the display device 302 might instead be or include a transparent display on which virtual content can be displayed against the backdrop of the real-world space to make the virtual content appear to be within that real-world space.

The display device 302 includes a display 304. Although the display 304 can be a single display, in some implementations the display 304 might actually be distributed, e.g. implemented by two or more separate displays that work together. For example, in the illustrated HMD of FIG. 1, the display 304 might consist of two small displays that work together, one display for each eye. As another example, the display 304 might actually be implemented by a plurality of micro-displays. Therefore, the term "display" as used herein refers to one or multiple displays that work together to display content.

The display device 302 includes a light source 306, which typically emits non-visible light, e.g. infrared, but could emit visible light. Although the light source 306 can be a single light source, in some implementations the light source 306 might actually be distributed, e.g. implemented by two or more separate sources of light. For example, in the illustrated HMD of FIG. 1, the light source 306 consists of two separate sources of light, one for each eye.

The display device 302 includes a light detector 308, e.g. a camera or optical sensor. The light detector 308 detects reflections, e.g. corneal reflections. Features such as a corneal reflection and center of a pupil may be captured by the light detector 308. The light detector 308 may alternatively be called and/or implemented by a light sensor or photodetector or photosensor, or image sensor, depending upon the implementation. Although the light detector 308 can be a single light detector, in some implementations the light detector 308 might actually be distributed, e.g. implemented by two or more separate detectors. For example, in the illustrated HMD of FIG. 1, the light detector 308 consists of two separate detectors of light, one for each eye.

The display device 302 further includes a processor 310 for controlling the operations of the display device 302, e.g. for performing operations such as rendering a view on the display 304, overlaying a UI onto the view, performing eye tracking (e.g. using reflections and/or images captured by the light detector 308), etc. The display device 302 further includes a memory 312 for storing information and instructions. The processor 310 may be implemented by one or more general-purpose processors that execute instructions stored in the memory 312. The instructions, when executed by the processor 310, cause the display device 302 to perform the operations of the display device 302 described herein, e.g. rendering a view on the display 304, overlaying a UI onto the view, performing eye tracking, etc. Alternatively, some or all of the processor 310 may be implemented using dedicated circuitry, such as an application specific integrated circuit (ASIC), a graphics processing unit (GPU), or a programmed field programmable gate array (FPGA).

The display device 302 further includes a network interface 314 for communicating over a network 316. The structure of the network interface 314 will depend on how the display device 302 interfaces with the network 316. For example, if the display device 302 is wireless, then the network interface 314 may include a transmitter/receiver with an antenna to send and receive wireless transmissions to/from the network 316. If the display device 302 is connected to the network 316 using a wire, then the network interface 314 may include a network interface cart (NIC), a port (e.g. USB port), and/or a network socket.

In some embodiments the display device 302 may include a sensor 315. The sensor 315 may capture a real-world space surrounding the display device 302, e.g. to render the real-world space on the display 304. The sensor 315 may obtain measurements of the real-world space, which may be used to generate representations of the real-world space within which AR content created such as a UI can be placed. The sensor 315 may additionally capture or detect movements performed by the human wearing the display device 302, such as a hand action, motion or gesture. The sensor 315 may include one or more cameras, and/or one or more radar sensors, and/or one or more lidar sensors, and/or one or more sonar sensors, and/or one or more gyro sensors, and/or one or more accelerometers, etc. Note that in VR applications the sensor 315 might not be included, or it might be included but might only sense movements.

The display device 302 may include other components not illustrated, such as a speaker. One or more of the components of the display device 302 may be integrated into a housing of the display device 302.

In some embodiments, the display device 302 may be referred to as a user device because it is the device used by the human user. The human may be referred to as a user.

In the illustrated embodiment, the display device 302 communicates with another computer in the system 300, referred to as a computing device 332. The display device 302 communicates with the computing device 332 over network 316. The network 316 may implement any communication protocol known in the art. Non-limiting examples of network 316 include a local area network (LAN), a wireless LAN, an internet protocol (IP) network, and a cellular network.

The computing device 332 may be a server, e.g. that controls and/or communicates with the display device 302 over the Internet. The computing device 332 includes a processor 334, a memory 336, and a network interface 338. The processor 334 may be implemented by one or more general-purpose processors that execute instructions stored in the memory 336. The instructions, when executed by the processor 334, cause the computing device 332 to perform the operations of the computing device 332. Alternatively, some or all of the processor 334 may be implemented using dedicated circuitry, such as an ASIC, GPU, or a programmed FPGA. The network interface 338 is for communicating over the network 316. The structure of the network interface 338 will depend on how the computing device 332 interfaces with the network 316. For example, if the computing device 332 is connected to the network 316 using a network cable, then the network interface 338 may include a NIC, a port (e.g. ethernet or optical port), and/or a network socket, etc.

In operation, the system 300 performs eye tracking to detect a gaze depth of a human's gaze and modifies a UI responsive to a change in the gaze depth. For example, a UI is generated and presented on display 304 overlaid onto a view, e.g. onto a view rendered on the display 304. Eye tracking is performed to detect a gaze depth of a gaze of a human viewing the display 304. The UI is modified responsive to a change in the gaze depth.

Depending upon the implementation, the processing operations of the system 300 may be performed: (1) primarily or exclusively on the display device 302, or (2) primarily or exclusively on the computing device 332, or (3) distributed between the display device 302 and the computing device 332. In an example of implementation (1), the processor 310 of the display device 302 generates the UI for presentation on display 304, presents the UI overlaid on the display 304, performs the eye tracking to detect the gaze depth of the human viewing the display 304, determines how to modify the UI in response to a change in gaze depth, and presents the modified UI on display 304. The computing device 332 might not be needed. In an example of implementation (2), the display device 302 performs minimal processing and instead the processing is performed by the computing device 332, which controls the display device 302. For example, the processor 334 of the computing device 332 generates the UI and possibly the displayed view and sends both to the display device 302 with an instruction for the UI to be presented on the display 304 overlaid on the view. The processor 334 of the computing device 332 controls the light source 306 and the light detector 308 via one or more instructions issued by the computing device 332 to the display device 304. The computing device 332 receives the information from the light detector 308 over network 316, which the processor 334 of the computing device 332 uses to perform eye tracking, including to detect a gaze depth of a gaze of a human viewing the display 304. The processor 334 of the computing device 332 modifies the UI in response to the change in the gaze depth and sends an instruction to the display device 302 to present the modified UI. In an example of implementation (3), eye tracking is performed by processor 310 of the display device 302, and the determined depth of gaze is sent to the computing device 332 over network 316. The processor 334 of the computing device 332 determines if and how the UI should be modified and sends the modified UI to the display device 302, which is then presented on the display 304 by the display device 302.

Figure 2:
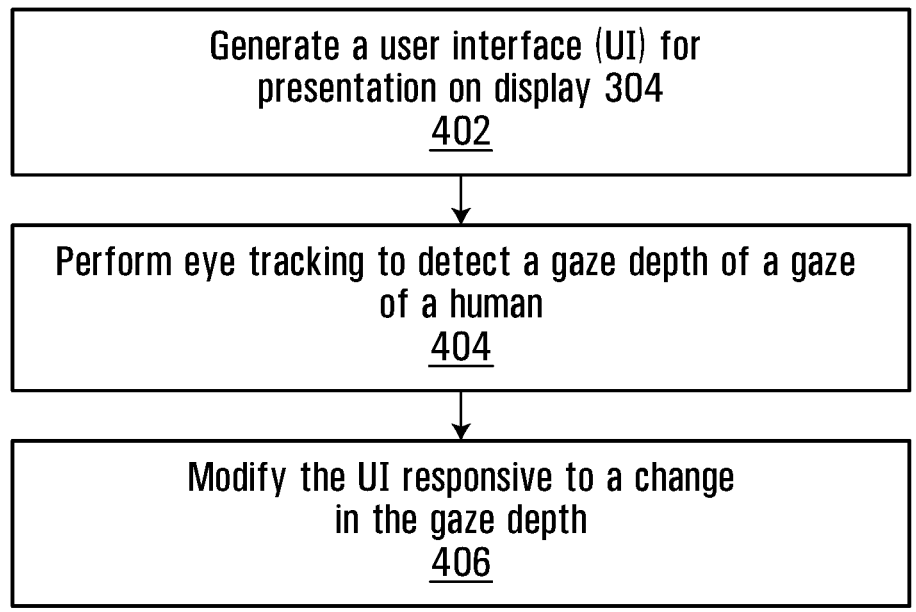
FIG. 2 illustrates a computer-implemented method according to some embodiments.

FIG. 2 illustrates a computer-implemented method according to some embodiments. The method may be performed by at least one processor, e.g. the processor 310 and/or the processor 334, depending upon the implementation.

At step 402, a UI is generated for presentation on display 304. The UI is overlaid onto a view, e.g. a view that is also (but not necessarily) rendered on the display 304. In some embodiments, at least part of the UI 502 is semi-transparent to show both the UI 502 and at least part of the view over which the UI 502 is overlaid.

Figure 3:
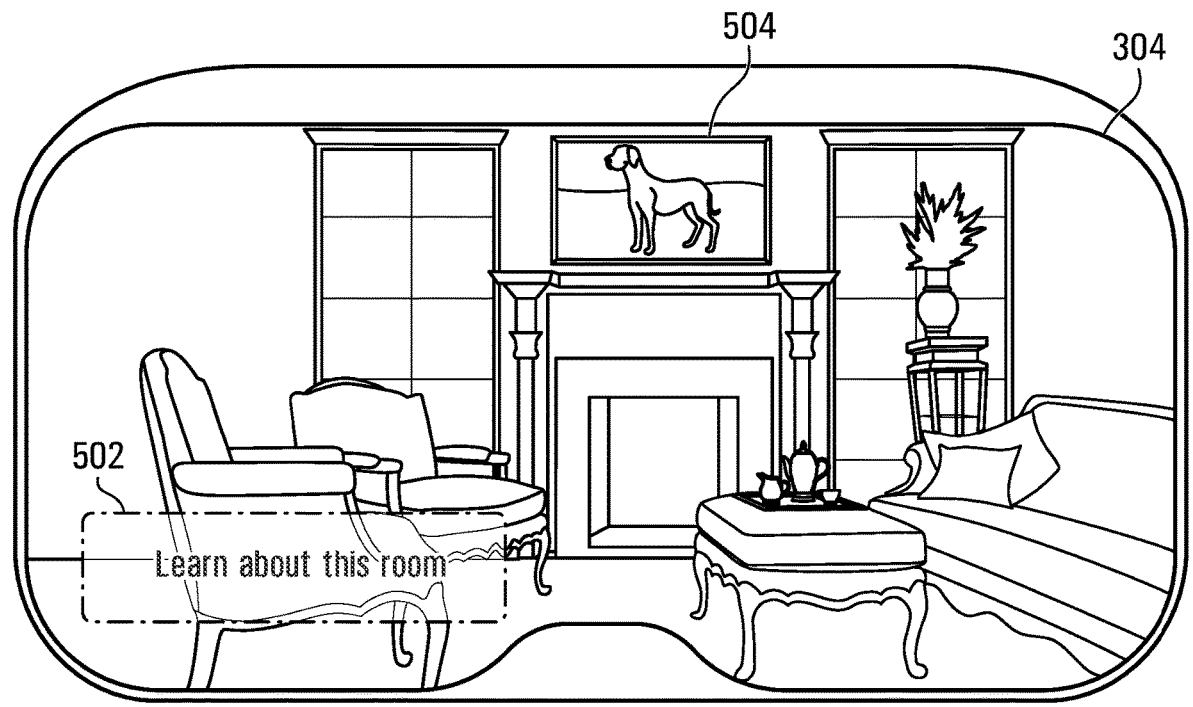
FIG. 3 illustrates an example view in which a UI is presented on a display overlaid onto a view.

For example, FIG. 3 illustrates an example view in which a UI 502 is presented on display 304 overlaid onto the view. The UI 502 is semi-transparent, although this is not necessary. In the example, the view is of a room rendered on the display 304, e.g. a room in a museum through which the human can move physically or virtually to learn about the items in the room. The UI 502 may provide content, e.g. information about an item in the view. In a VR application, the room may be a virtual room. In an AR application, the room might be a real room. For example, the illustrated room may be a real room in the real-world space captured by the sensor 315 of the display device 302 and rendered on the display 304. The sensor 315 may include a lidar, radar, sonar, or other sensor to measure the distance between the display device 302 and points of the real-world space captured by the sensor 315. Simultaneous localization and mapping (SLAM) may be performed to generate a virtual map representing the real-world space. The virtual map may be built and aligned with the real-world space captured by the sensor 315. This virtual map might not be visible to the human viewer, but might enable the placement of AR content, such as UI 502, within the view of the real-world space rendered on display 304.

Returning to FIG. 2, at step 404 eye tracking is performed to detect a gaze depth of a gaze of a human. The human is viewing the display 304, although in the case of a see-through display, e.g. smart glasses, the display 304 may be transparent such that when the human views the display 304 the human sees the real-world through the display 304, along with the UI 502 presented on the display 304 overlaid onto the real-world view. An example method of performing eye tracking and using eye tracking to detect a gaze depth of a gaze are described later in relation to FIGS. 12 to 14.

At step 406, the UI 502 is modified responsive to a change in the gaze depth. For example, depending upon whether the human is viewing something closer or farther away in the view, the UI 502 can modify. Examples are provided below.

In some embodiments of the method of FIG. 2, modifying the UI 502 responsive to the change in gaze depth includes modifying the UI 502 to be less visually prominent responsive to the gaze depth increasing. The gaze depth increases when the human is viewing something that is or is perceived to be (e.g. through the illusion of 3D) farther away from the human. One example is as follows. With reference to FIG. 3, the human may physically or virtually move closer to the painting 504. The human may provide some sort of indication that he or she wishes to learn more about the painting 504, e.g. by looking in a particular gaze direction and/or by having a particular gaze depth (e.g. a gaze depth equal to that of the painting 504) and/or by gesturing in a particular way, touching a physical or virtual button, etc. In response, the UI 502 may move and be overlaid on top of at least a portion of the view such that it is in front of that portion view. For example, with reference to FIG. 4, the UI 502 may be overlaid on top of the painting 504 and provide information about the painting 504. The UI 502 corresponds to a gaze depth that is closer than that of the painting 504. For example, with reference to FIG. 5, when the human's eyes 512 are focusing on the UI 502 the gaze depth of the gaze is a depth d1, which is shorter than the gaze depth d2 corresponding to if the eyes 512 were instead focusing on the painting 504 behind the UI 502. Returning to FIG. 4, as the human reads the information on the UI 502, the gaze depth of the gaze corresponds to the gaze depth d1 of the UI 502. When the human subsequently modifies his or her gaze depth, e.g. by increasing his or her gaze depth to gaze through the UI 502 to the painting 504, in response the UI 502 may become less visually prominent. For example, in response to the gaze depth increasing, e.g. from d1 to d2, the UI 502 may modify to become the updated UI 502 illustrated in FIG. 6. The UI 502 in FIG. 6 is less visually prominent in that it is more transparent and there is less content on the UI 502.

In embodiments in which the UI 502 is modified to be less visually prominent, the modifying may include at least one of: increasing transparency of the UI 502; reducing a size of the UI 502; moving the UI 502; or reducing an amount or size of content on the UI 502. For example, the UI 502 in FIG. 6 compared to FIG. 4 has increased transparency allowing the picture itself (e.g. the dog) to be more clearly viewed, and has reduced content because the information about the painting 504 is no longer displayed on the UI 502.

Figure 4:
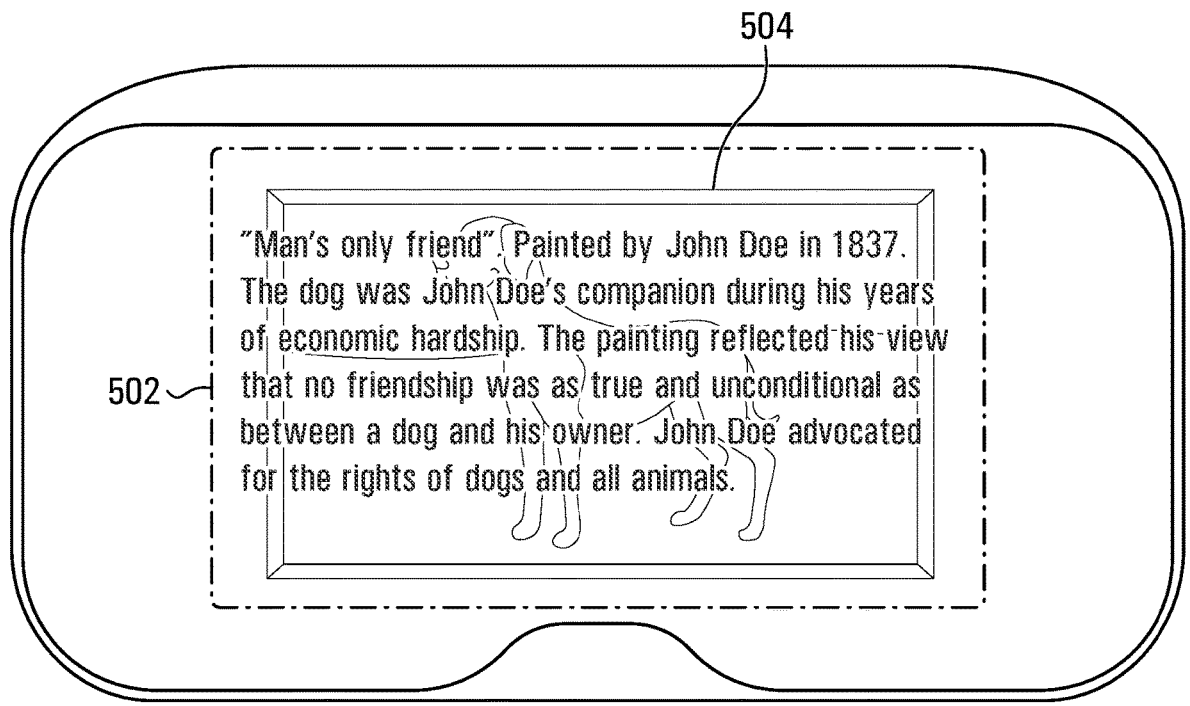
FIGS. 4 to 6 illustrate an example of a UI overlaid on a painting, where the UI modifies based on gaze depth.
Figure 5:
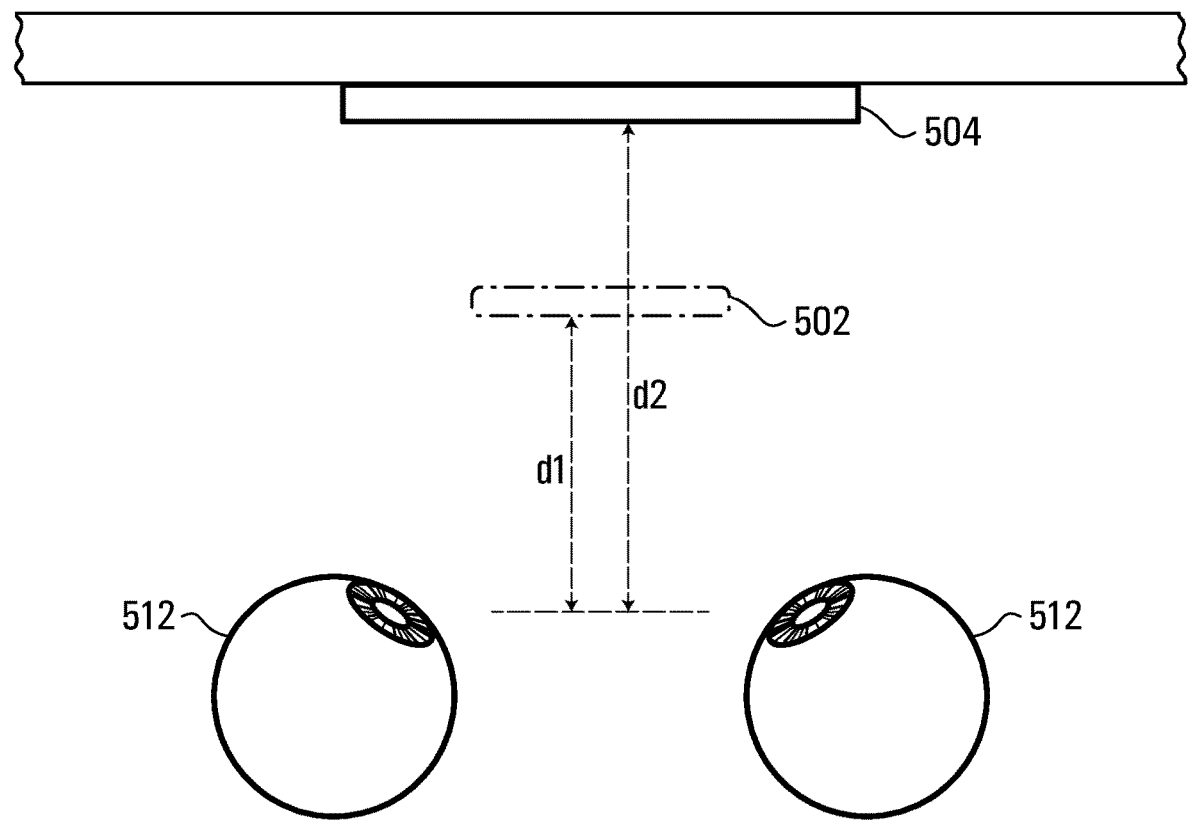
Figure 6:
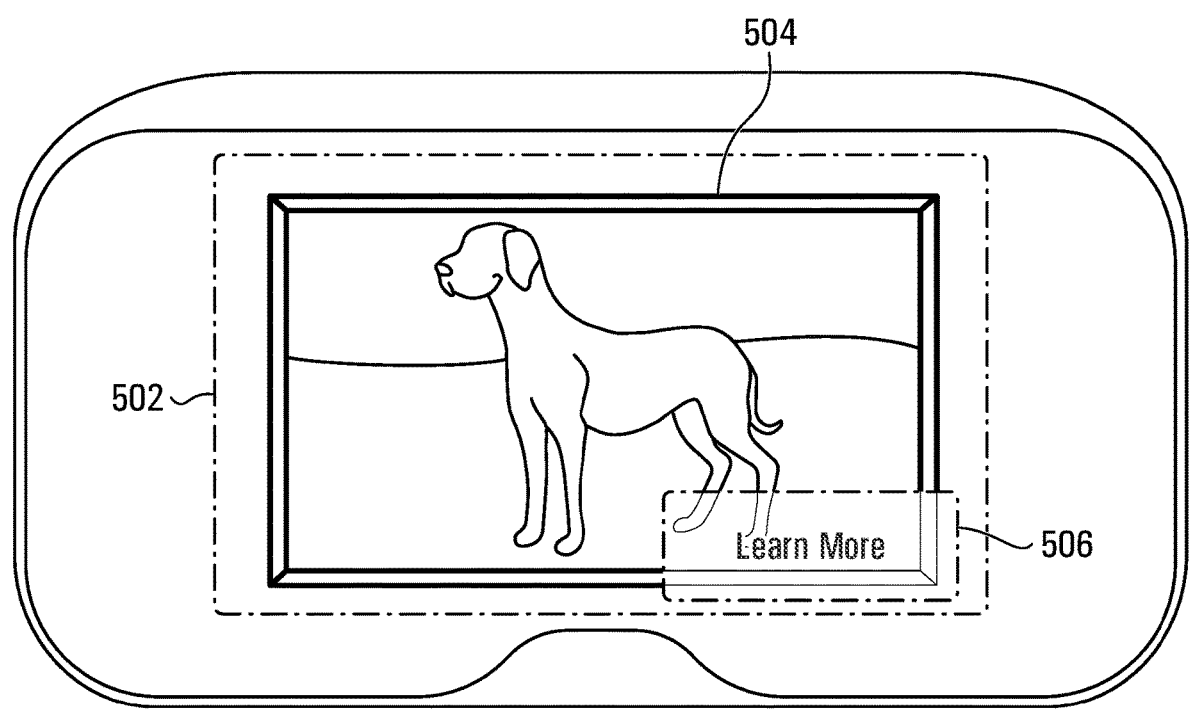

The example explained in relation to FIGS. 4 and 6 is just one example. The UI 502 does not have to overlay an item being viewed behind the UI 502. For example, the UI 502 may be that shown in FIG. 3. In response to the gaze depth of the human's gaze increasing, e.g. to view deeper into the room, the UI 502 may be modified to be made smaller on the premise that the human is not interested in engaging the UI 502, but is more interested in viewing the room. The human does not necessarily have to be looking through the semi-transparent UI 502 of FIG. 3. Instead, the human could be looking somewhere else in the room.

In some embodiments of the method of FIG. 2, a visual focusing aid may be displayed on display 304, e.g. in the form of virtual content. The visual focusing aid may be part of the UI 502, although it could instead be separate from the UI 502. The visual focusing aid is associated with a decreased gaze depth. For example, the visual focusing aid may be in front of a portion of a view. In some embodiments, the UI 502 may be in front of a portion of the view and the visual focusing aid may be part of the UI 502. In some embodiments, when the human has a gaze depth that is greater than that of the UI 502's depth (e.g. the user is gazing through the UI 502), the UI 502 becomes less visually prominent, but there still may remain the focusing aid associated with the UI 502. In embodiments in which there is a focusing aid, responsive to the gaze depth subsequently changing to the decreased gaze depth associated with the focusing aid, the UI 502 may be modified to be more visually prominent.

For example, a human's gaze may have an increased gaze depth, e.g. because the human is looking at something that is or is perceived to be farther away. The visual focusing aid is displayed and is associated with a decreased gaze depth, e.g. it is part of UI 502 overlaid in front of at least some of the view at a depth that appears closer to the human. The human's gaze changes to the decreased gaze depth, e.g. because the human switches to looking at the focusing aid. In response the UI 502 modifies to become more visually prominent. In the example in FIG. 6, the human is gazing through the UI 502 to the painting 504, which is at an increased gaze depth, i.e. it is or appears farther away to the human compared to the UI 502. The human then decreases his or her gaze depth to a depth corresponding to that of the UI 502, e.g. gazes at the "learn more" virtual icon 506 in front of the dog's lower back legs by converging the eyes on the virtual icon 506. In response, the UI 502 modifies to be more visually prominent, e.g. the UI 502 modifies to the UI 502 illustrated in FIG. 4. The "learn more" virtual icon 506 of FIG. 6 is an example of a visual focusing aid that is associated with the decreased gaze depth. In response to the human's gaze depth changing to, e.g., include the plane of the focusing aid, the UI 502 modifies to become more visually prominent, e.g. the UI 502 of FIG. 6 changes to the UI 502 of FIG. 4.

The "learn more" virtual icon 506 of FIG. 6 is just one example of a visual focusing aid. More generally, the focusing aid can be any virtual content such as a virtual object or marker that might or might not be part of UI 502. If the focusing aid is on or associated with the UI 502, it might be a point or box or a border around the UI 502. In some embodiments, the focusing aid may be a computer-generated specular reflection.

In some embodiments of the method of FIG. 2, modifying the UI 502 responsive to the change in gaze depth includes modifying the UI 502 to be more visually prominent responsive to the gaze depth decreasing. The gaze depth decreases when the human is viewing something that is or is perceived to be (e.g. through the illusion of 3D) closer to the human. Modifying the UI 502 to be more visually prominent may include at least one of: decreasing transparency of the UI 502; enlarging a size of the UI 502; moving the UI 502; moving content on the UI 502; or increasing an amount or size of content on the UI 502. One example is already discussed above. That is, with reference to FIG. 6, the human is gazing through the UI 502 to the painting 504, which is at an increased gaze depth, i.e. the painting 504 is or appears farther away to the human compared to the UI 502. The human then decreases his or her gaze depth to a depth corresponding to that of the UI 502, e.g. gazes at the "learn more" virtual icon 506 in front of the dog's lower back legs. In response, the UI 502 modifies to be more visually prominent by changing to the UI 502 illustrated in FIG. 4. The UI 502 of FIG. 4 is more visually prominent compared to FIG. 6 (i.e. compared to the increased gaze depth) because it is less transparent and includes more content. Other ways of making the UI 502 more visually prominent may include enlarging the size of the UI 502 or moving content on the UI 502 or increasing a size of content on the UI 502.

The example explained in relation to FIGS. 4 and 6 is just one example. The UI 502 does not have to be overlaid over content being viewed behind the UI 502. For example, the UI 502 may be that shown in FIG. 3. In response to the gaze depth of the human's gaze decreasing, e.g. such that the human is not viewing deep into the room, the UI 502 may be modified to be made larger and/or include additional content (e.g. a menu) on the premise that the human is potentially interested in engaging the UI 502. The human does not necessarily have to be looking through the semi-transparent UI 502 of FIG. 3. Instead, the human could be looking somewhere else in the room.

In view of the examples above, some embodiments of the method of FIG. 2 may include modifying the UI 502 responsive to a change in gaze depth of a human by modifying the UI 502 to be less visually prominent responsive to the gaze depth increasing and modifying the UI 502 to be more visually prominent responsive to the gaze depth decreasing. In some embodiments, when the gaze depth corresponds to the UI 502's depth, the UI 502 becomes more visually prominent, e.g. becomes less transparent and/or bigger and/or moves and/or displays more content. An example is the UI 502 in FIG. 4. When the human is finished looking at the UI 502, he or she may change his or her gaze depth to view something that is at a greater depth than the depth of the UI 502. For example, if the UE 502 is semi-transparent, the human may gaze through the UI 502 to view an item behind the UI 502. In response to the user changing his or her gaze depth to view something at a greater depth than the UI 502, the UI 502 changes, e.g. to become less visually prominent like the UI 502 in FIG. 6. Assuming the human is looking through the UI 502 to behind the UI 502, then by having the UI 502 become less visually prominent, it makes it easier for the human to see through the UI 502 to the view behind the UI 502. However, gazing through the UI 502 to behind the UI 502 is not necessary, e.g. the human may look at something that is not overlaid by the UI 502 but that is still at a greater gaze depth than the UI 502. This may particularly be the case if the UI 502 is presented on one side or corner of the display 302, like UI 502 in FIG. 3.

In some embodiments of FIG. 2, the method may include modifying at least part of the view rendered on the display 304 to make the view less visually prominent. For example, if the human is viewing the painting 504 in FIG. 3, at least a portion of the room not including the painting (e.g. surrounding the painting) may be modified to be less visually prominent, e.g. it may be visually altered to become less visually prominent. For example, it may be faded, dimmed, or blurred. This may have the effect of making the painting 504 appear more visually prominent. In another example, when the UI 502 is being viewed, at least some of the view outside the boundaries of the UI 502 and/or at least some of the space at a greater gaze depth than the UI 502 (e.g. the view behind the UI 502) may be visually altered to become less visually prominent (e.g. it may be faded, dimmed, or blurred). For example, if the UI 502 in FIG. 4 is being viewed, the painting 504 behind the UI 502 and/or the area surrounding the UI 502 may be visually altered to become less visually prominent thereby causing the UI 502 to appear more visually prominent and/or to make the text displayed on the UI 502 easier to read. In some embodiments, making the view rendered on the display 304 less visually prominent may be tied to the gaze depth decreasing, e.g. if the gaze depth decreases such that the human is not looking at items that are or are perceived to be farther away, then in response the view of those items may be made less visually prominent, e.g. faded, blurred, or dimmed. When the gaze depth increases again the view of those items may again be made more visually prominent. In some embodiments, making the view rendered on the display 304 less visually prominent may be tied to the UI 502 being made more visually prominent. For example, in response to the gaze depth decreasing, the UI 502 may be made more visually prominent and at least part of the view not including the UI 502 may be made less visually prominent.

In some embodiments, modifying the UI 502 responsive to the change in gaze depth in step 406 may include changing content displayed on the UI 502. This may be implemented instead of or in addition to modifying the UI 502 to be more or less visually prominent. In some cases, changing the content on the UI 502 might actually make the UI 502 more or less visually prominent. In some embodiments, the changed content is also based on a direction of the gaze. Two examples are as follows.

Figure 7:
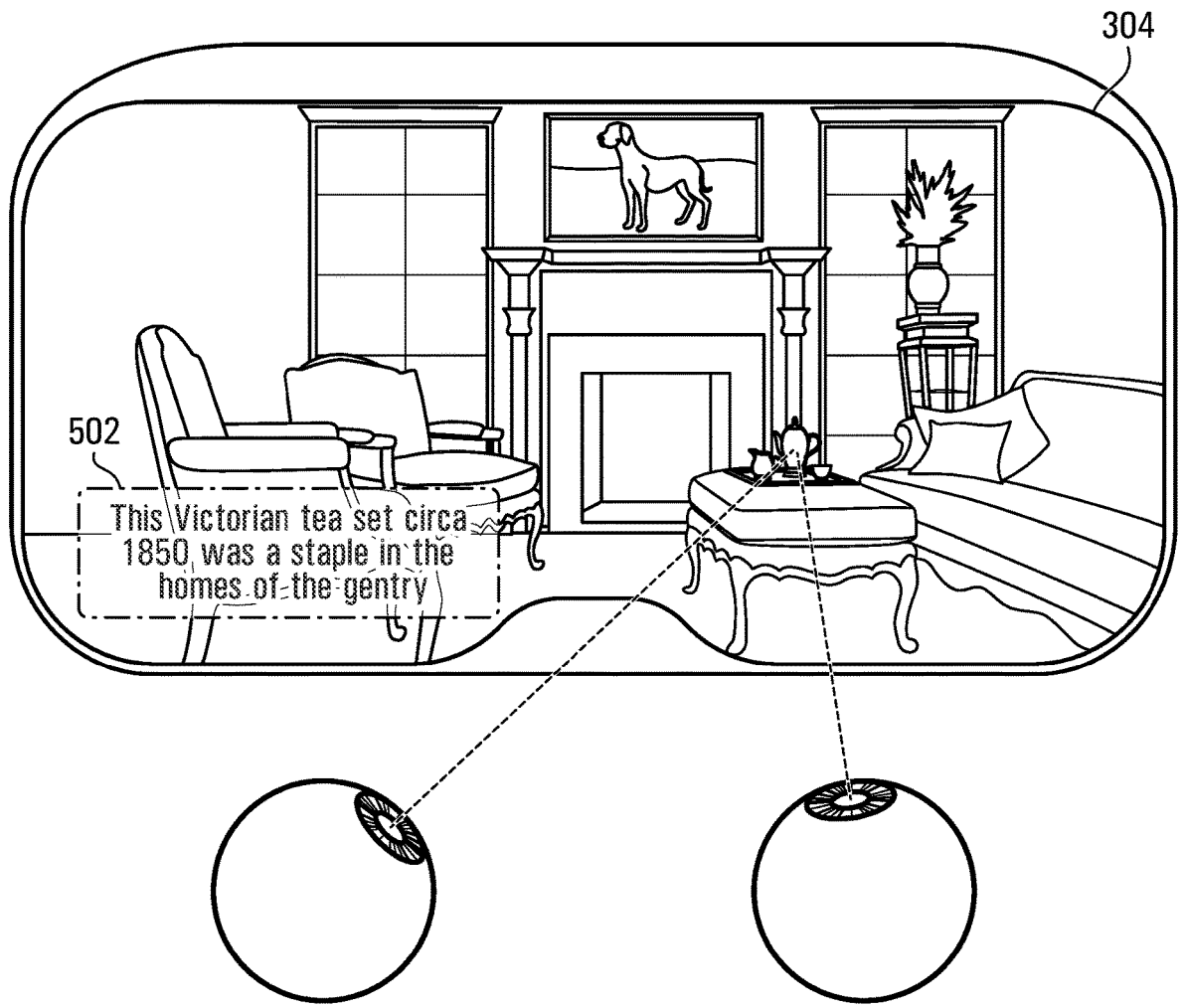
FIGS. 7 to 11 illustrate examples of changing content of a UI based at least in part on gaze depth.

In a first example, with reference to FIG. 7, eye detection is performed to determine both the direction of gaze and the gaze depth. It is determined that the human is looking at the tea set on the display 304. In response, the UI 502 is modified to display content about the tea set. Then, with reference to FIG. 8, the human subsequently looks at the vase on the display 304. Eye detection determines both the direction of gaze and the gaze depth to reveal that the vase is the item being viewed. In response, the UI 502 modifies to instead display content about the vase.

Figure 9:
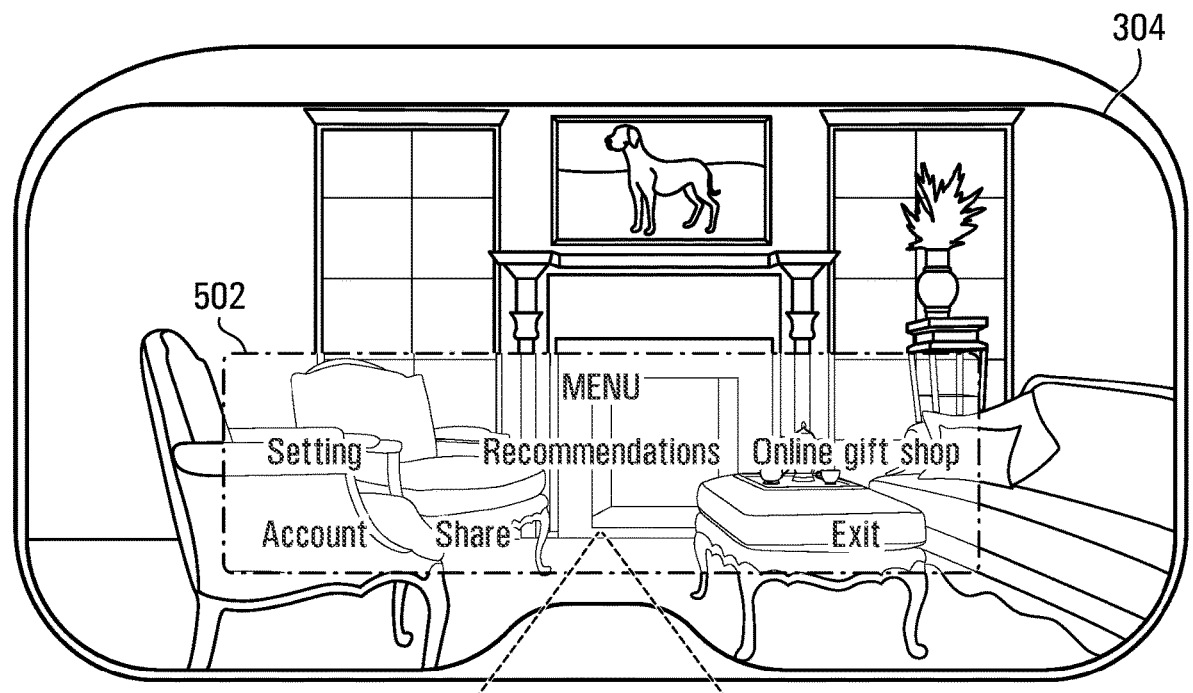
Figure 10:
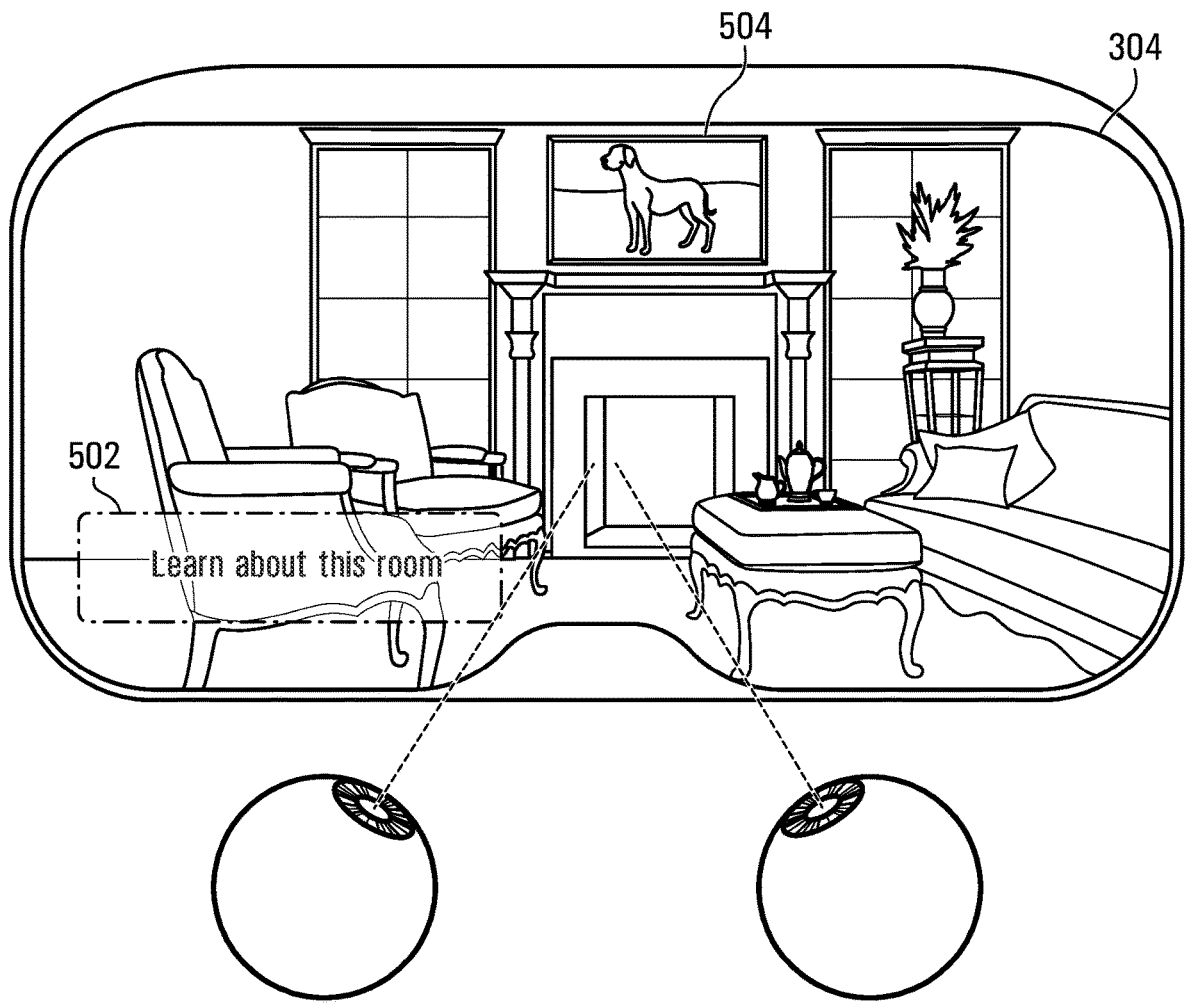

In a second example, with reference to FIG. 9, based on the gaze depth of the human's gaze it is determined that the human is no longer peering deep into the room but is instead viewing the UI 502 in front of the view. In response, the UI 502 changes to display different content in the form of a menu. When the human is finished reading the menu, the human may peer through the menu to view the room, which is at a greater gaze depth. In response, the menu disappears and, with reference to FIG. 10, the UI 502 changes and instead displays a smaller "learn more about this room" box. In this second example, the UI 502 is modified to change its content responsive to the change in gaze depth without necessarily taking into account the direction of gaze. The content displayed is a menu (FIG. 9) when the gaze depth of the human's gaze is at a point that is near to the human or is perceived to be near to the human, and the menu disappears (FIG. 10) when the gaze depth of the human's gaze is at a point that is farther from the human or is perceived to be farther from the human.

Figure 8:
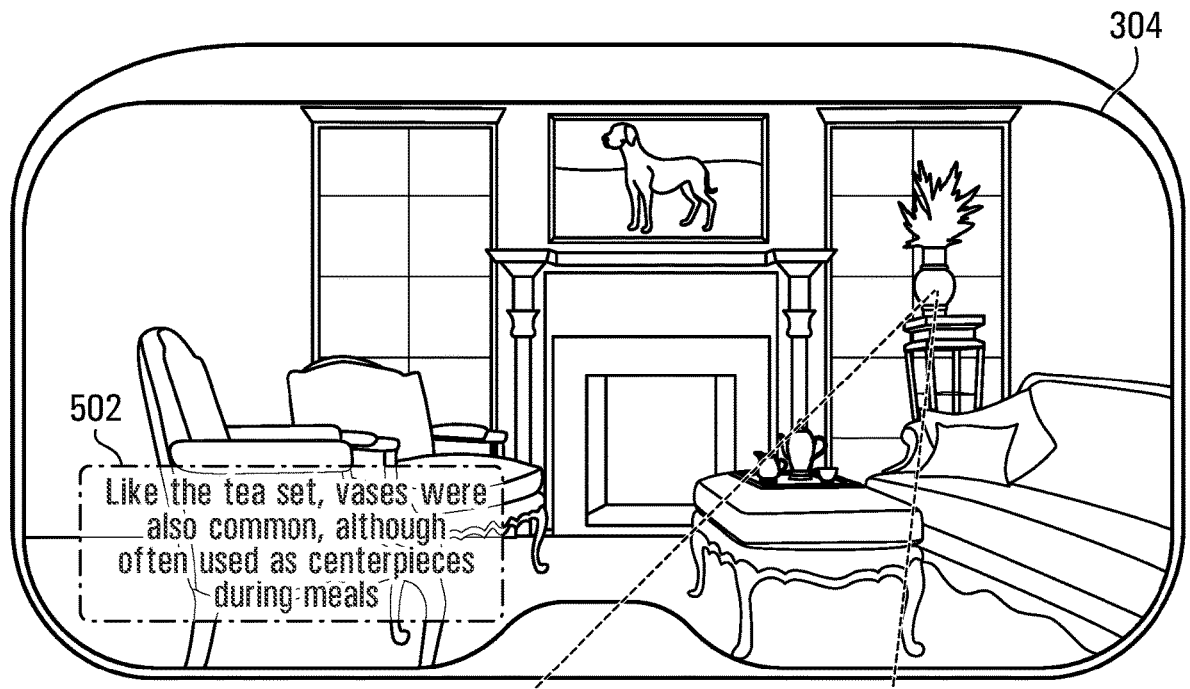

In some embodiments, the content of the UI 502 may update to be contextual to the last item the human focused on. For example, if the human looks at a first painting followed by a second painting, the UI 502 may describe the second painting making reference to the first painting (e.g. discussing the differences between the first painting and the second painting). As another example, the content displayed on the UI 502 in FIG. 8 is based on the knowledge that the human just previously looked at the tea set in FIG. 7, which is why the UI 502 in FIG. 8 has content that references a tea set viewed in FIG. 7.

In some embodiments, the UI 502 may display information unrelated to the item(s) or scene being viewed, e.g. the UI 502 may display a cart, account information, settings, a menu, etc. For example, in FIG. 9 the UI 502 displays a menu that has options independent of the item(s) or scene being viewed. The menu is the same no matter what room the human is viewing.

Figure 11:
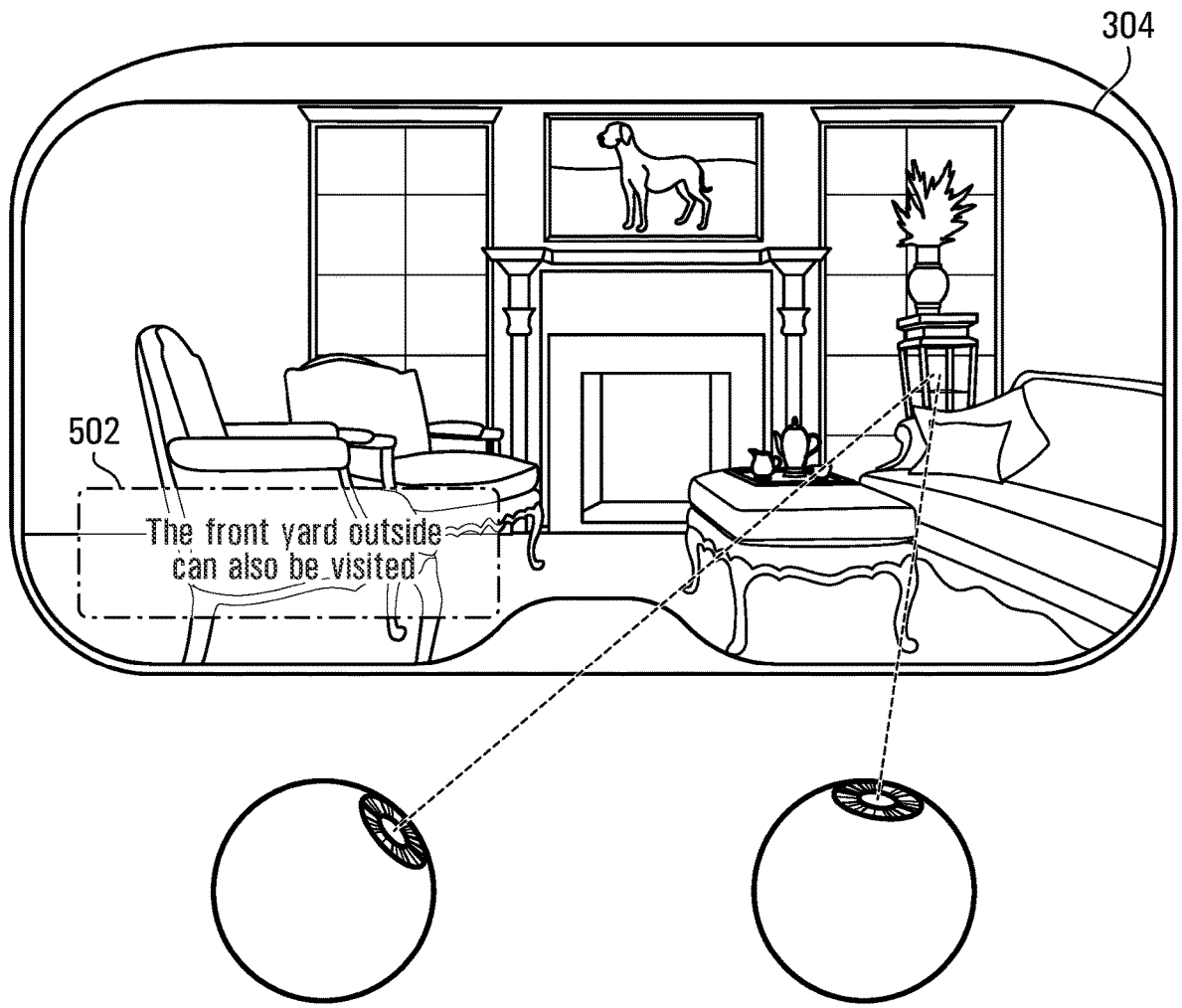

In some embodiments, when the human is looking in a particular direction and there are multiple items in that direction at different gaze depths, it may be determined which item is of interest based on the gaze depth. That might influence the content of the UI 502. For example, with reference to FIG. 11, if the human gazes towards the vase stand, the gaze depth can be used to determine that the user is looking through the window behind the vase stand, rather than at the vase stand. In response, the content of the UI 502 may change appropriately, e.g. provide information about the yard outside the window. If the gaze depth then changes to look at the vase stand, the content of the UI 502 may change to provide information about the vase stand. In some embodiments, the UI 502 may also or instead be made less visually prominent and/or more visually prominent and/or content may be changed, added, or removed from the UI 502 depending on the item of interest identified based on the gaze depth.

In some embodiments of the method of FIG. 2, the UI 502 may also or instead be modified based on gaze direction, e.g. if the human looks away from the UI 502, then the UI 502 becomes less visually prominent. In some embodiments, based on the combination of the determined gaze depth and the determined direction of gaze it is determined that the human is viewing a particular item. The UI 502 may dynamically respond based on whether or not the UI 502 is at least partially occluding the particular item. For example, if the UI 502 is partially or fully occluding the item, the UI 502 may be modified to no longer occlude the item, e.g. by becoming less visually prominent, which may involve making the UI 502 smaller and/or more transparent and/or moving the UI 502. In some embodiments, the UI 502 may again modify when the gaze and/or gaze depth changes such that it is determined that the human is no longer looking at the particular item. For example, the UI 502 may return to its previous state and/or become more visually prominent, which may involve making the UI 502 bigger and/or less transparent and/or moving the UI 502 so that it again at least partially occludes the particular item. As an example, with reference to FIG. 3, if it is determined from the gaze depth and direction of gaze that the human is viewing the chair behind the UI 502, the UI 502 may move so that it is not occluding the chair, e.g. the UI 502 may move to the bottom right of the display 304. Therefore, in some embodiments the method of FIG. 2 may include: determining a direction of gaze; determining, based on the gaze depth and the direction of gaze, that the human is viewing a particular item (e.g. a particular item rendered on the display 304); and responsive to the determining that the human is viewing the particular item, modifying the UI 502.

In some embodiments of the method of FIG. 2, the gaze depth that is detected before the change in the gaze depth is an initial gaze depth, and modifying the UI 502 responsive to the change in the gaze depth may include determining a duration of time during which the gaze depth remains changed compared to the initial gaze depth, and modifying the UI 502 responsive to the duration of time exceeding a threshold. This results in the human having to maintain the gaze depth for a certain amount of time (e.g. two seconds) before the UI 502 changes to prevent "glitchy" UI 502 behaviour. For example, if the human is viewing the tea set in FIG. 7 ("the initial gaze depth"), and the human quickly glances at the vase ("the changed gaze depth"), the content of the UI 502 will not change. The content will only change if the human's gaze remains on the vase, i.e. the initial gaze depth changes to the changed gaze depth for a certain amount of time exceeding a threshold. The threshold may be, for example, two seconds. Additionally, or alternatively, modification of the UI 502 (e.g. to change its content and/or to become more or less visually prominent) may occur gradually so as to have the appearance of a smooth transition to the human.

Figure 12:
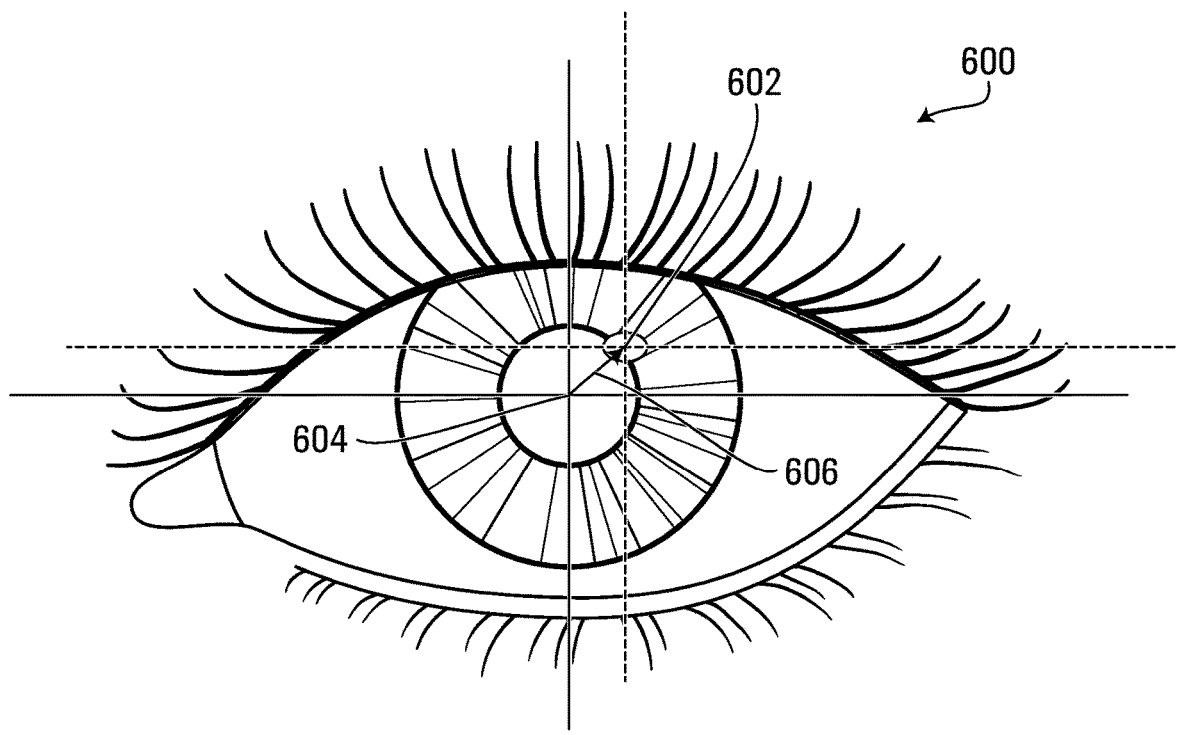
FIGS. 12 to 14 illustrate example ways of determining direction of gaze and gaze depth.

Step 404 of the method of FIG. 2 involves performing eye tracking. Various methods of eye tracking may be performed. One example way of performing eye tracking is as follows. Light, e.g. infrared light, is emitted by light source 306. The light is directed to, and reflects off of, each eye and is captured by light detector 308. For example, the light source 306 may direct infrared light onto the eyes and the light detector 308 may be a camera that takes a high-resolution image of the eyes. FIG. 12 illustrates an example eye 600. The light reflected off of the eye 600 includes a corneal reflection 602 and a pupil center 604 that are captured in the image by the light detector 308. Using the image from the light detector 308, the estimated center of the corneal reflection 602 and the estimated center of the pupil 604 are identified, e.g. using feature detection. A direction of gaze of the eye 600 may be determined from the vector 606 formed between the estimated center of pupil 604 and the estimated center of corneal reflection 602. The process may be repeated for the other eye.

Figure 13:
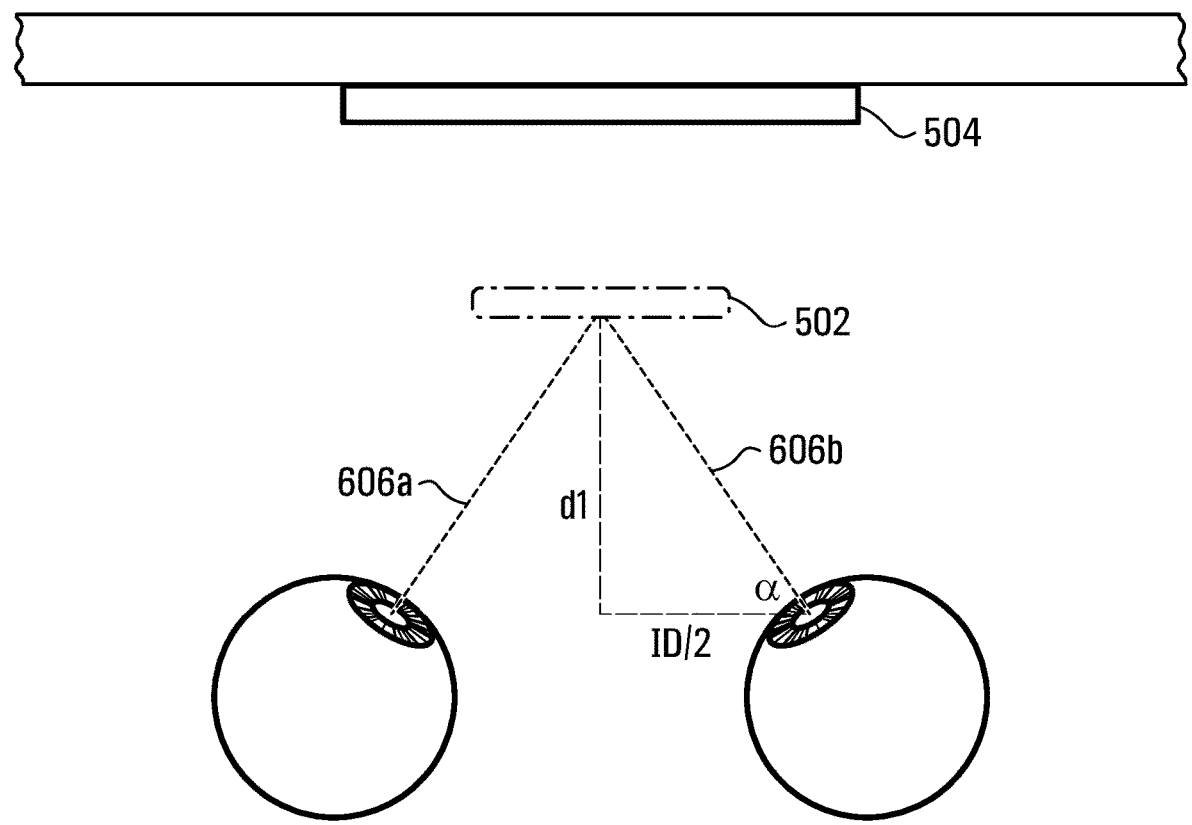
Figure 14:
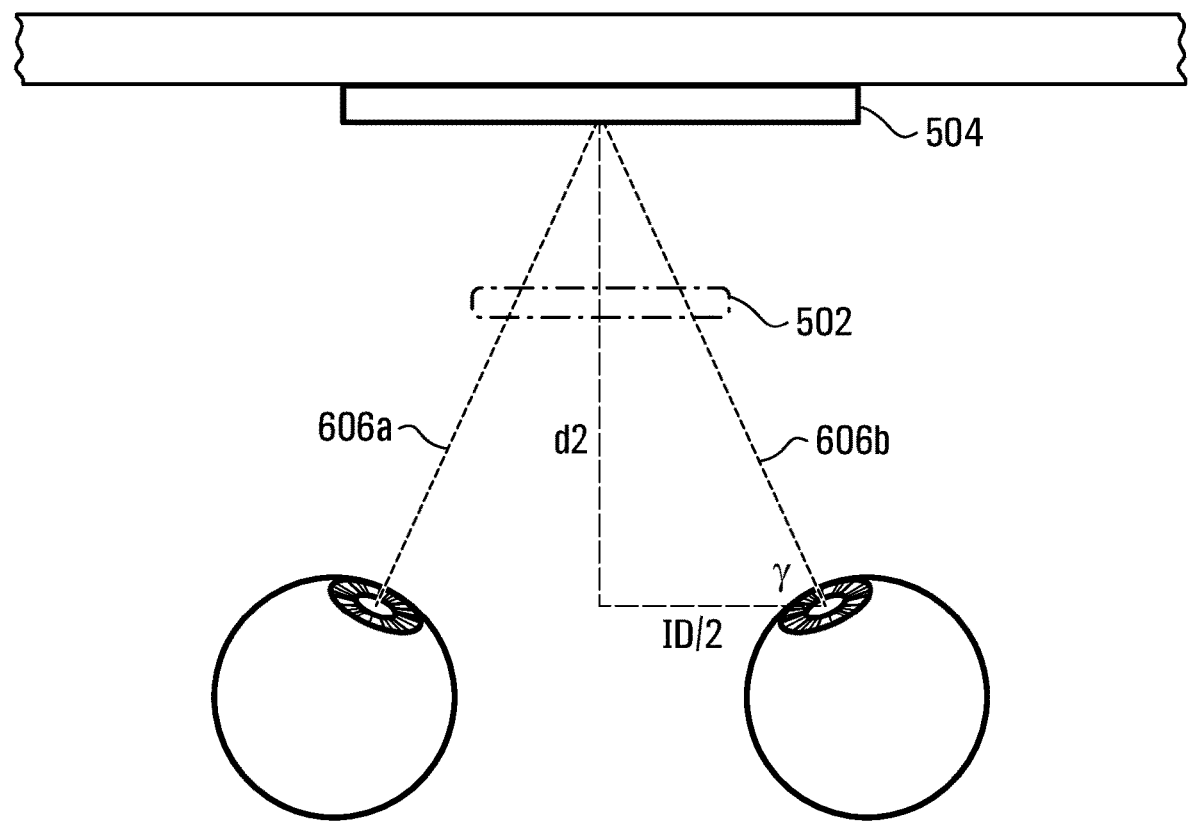

One method to determine the gaze depth of the human's gaze is as follows. Eye tracking is used to determine, for each eye, the vector representing the gaze direction of each eye, e.g. vector 606 described above in relation to FIG. 12. A first vector represents the gaze direction of the left eye, and a second vector represents the gaze direction of the right eye. The gaze depth is then determined based on the convergence of the first vector and the second vector. In some embodiments, the convergence may be determined based on the angle of one or both vectors and the interpupillary distance. For example, FIG. 13 illustrates a gaze depth d1 at a depth corresponding to that of the UI 502. The gaze depth d1 is computed based on convergence of the vector 606a representing the gaze direction of the left eye and the vector 606b representing the gaze direction of the right eye, e.g. using the angle of one or both vectors and the interpupillary distance input into a trigonometric function. For example, the angle of the vector 606b representing the gaze direction of the right eye is $\alpha$, and the interpupillary distance is ID. The gaze depth d1 may possibly be determined using ID/2 multiplied by tan $\alpha$. FIG. 14 illustrates a gaze depth d2 at a depth corresponding to that of the painting 504. The gaze depth d2 is computed based on convergence of the vector 606a representing the gaze direction of the left eye and the vector 606*b* representing the gaze direction of the right eye, e.g. using the angle of one or both vectors and the interpupillary distance input into a trigonometric function. For example, the angle of the vector 606*b* representing the gaze direction of the right eye is γ, and the interpupillary distance is ID. The gaze depth d2 may possibly be determined using ID/2 multiplied by tan γ. The gaze depth d2 is greater than d1 because although the interpupillary distance ID has not changed, the angle of gaze γ is greater than the angle of gaze α because the human is looking at the painting 504 behind the UI 502.

The eye tracking may involve determining the direction of gaze and the gaze depth continuously, or very frequently. In some embodiments, a calibration process may be performed, e.g. to associate certain convergence points/depths (e.g. certain intersections of the two eye vectors) with actual or perceived depths at which the human is looking.

Although eye tracking is described above as the means for determining the gaze depth, in other embodiments a method other than eye tracking may be used to determine the gaze depth, e.g. depth may be determined based on user input, e.g. the user gesturing or selecting something on the head-mounted display indicating a gaze depth.

Technical benefits of some embodiments may include the following. When a human gazes in a particular direction, it could sometimes be the case that there are multiple items located in that gaze direction, each at a different depth. By determining the gaze depth, it may be possible to more accurately determine the item at which the human is looking. For example, the direction of gaze may first be determined, and then the gaze depth determined, to obtain the gaze depth in the gaze direction and thereby identify an item at that direction and depth. In embodiments in which there is a UI, the UI may be able to change depending upon the item identified. For example, the UI may move to avoid occluding an item being viewed. In scenarios in which the UI is semi-transparent and there are items behind the UI, it may be determined whether the human is gazing at the UI or at the items behind the UI. For example, if the UI changes depending upon the item at which the human is looking, then without performing eye tracking to detect gaze depth, the content of the UI may change continuously as the human's eyes move across the UI content, e.g. because the gaze direction is changing and intersecting with different items behind the UI, hence causing the UI content to change as the eyes move to different items. Instead, by using the gaze depth information a poor user experience may be prevented because it may be determined that the human is engaged with the content currently displayed on the UI, i.e. the depth of gaze corresponds to the depth of the UI, not the depth of the items behind the UI. The UI will therefore not render new content as the human views/reads the content on the UI. For example, as the human reads the menu in FIG. 9, the UI 502 will not change even though the menu is in the same gaze direction as items behind the menu. This is because the gaze depth reveals that the human is looking at the menu rather than looking behind the menu.

Many variations and examples of FIG. 2 are described herein. Permutations of all of these variations and examples are contemplated. For example, any method of determining a gaze depth of a human gaze may be combined with any method of modifying a UI to be more or less visually prominent and/or any method of modifying a UI to change content displayed on the UI. As another example, modifying a UI to change content displayed on the UI might or might not be combined with any method of modifying the UI to more or less visually prominent. As another example, any method of determining an item of interest (e.g. using gaze direction, gaze depth, or a combination of both) may be combined with any method of modifying a UI described herein.

In some scenarios the embodiments described herein may be implemented in the context of commerce. For example, in VR or AR a human may view a showroom having products for sale. A UI may display information about the products. The UI may modify depending at least in part on the gaze depth of the human's gaze as he or she views the showroom. In commerce scenarios, the system 300 may be implemented in or as part of an e-commerce platform. Therefore, an example e-commerce platform is described below.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 15:
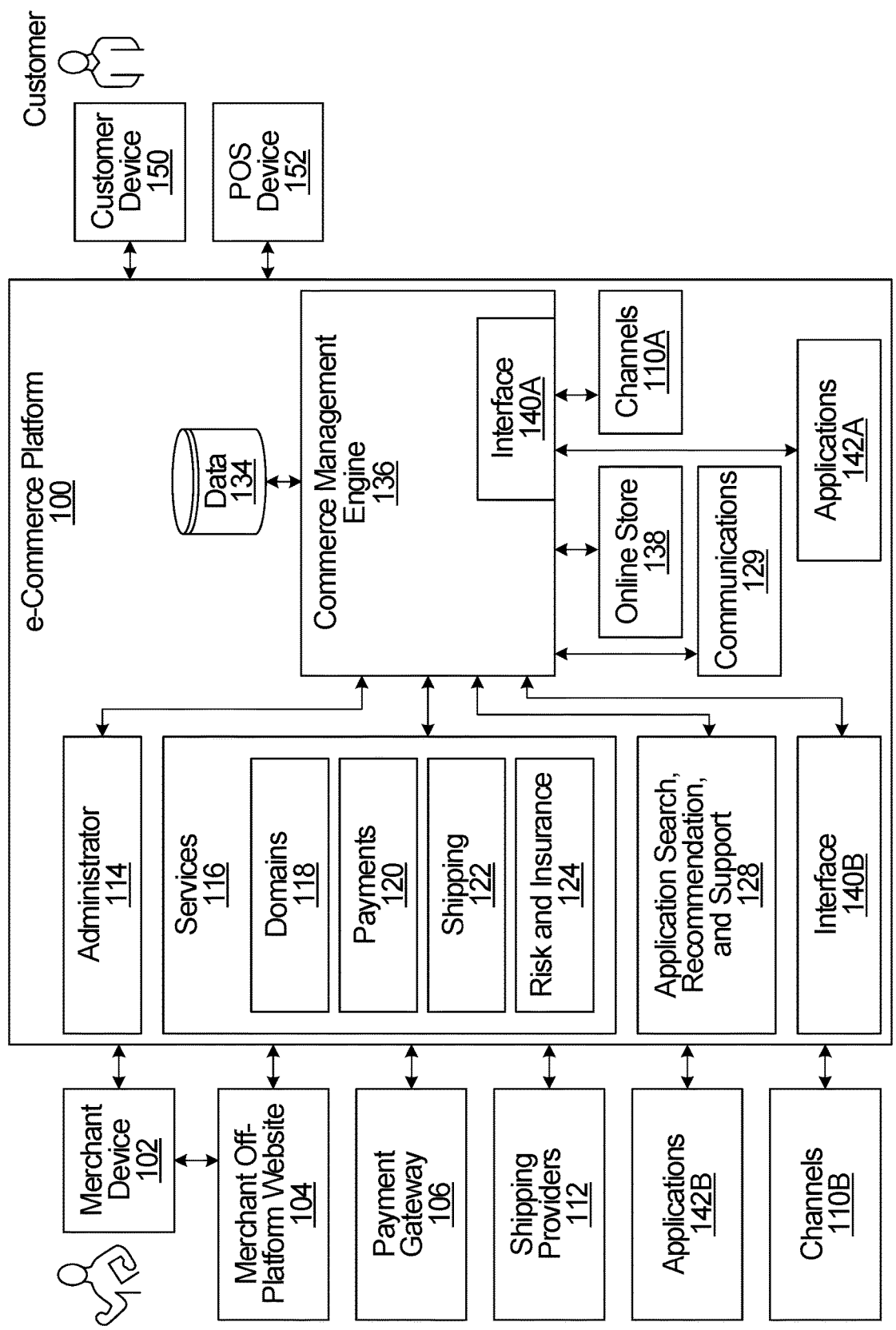
FIG. 15 illustrates an e-commerce platform, according to some embodiments.

FIG. 15 illustrates an example e-commerce platform 100, according to some embodiments. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 15, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 16 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 16. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 15, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In some embodiments, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Figure 17:
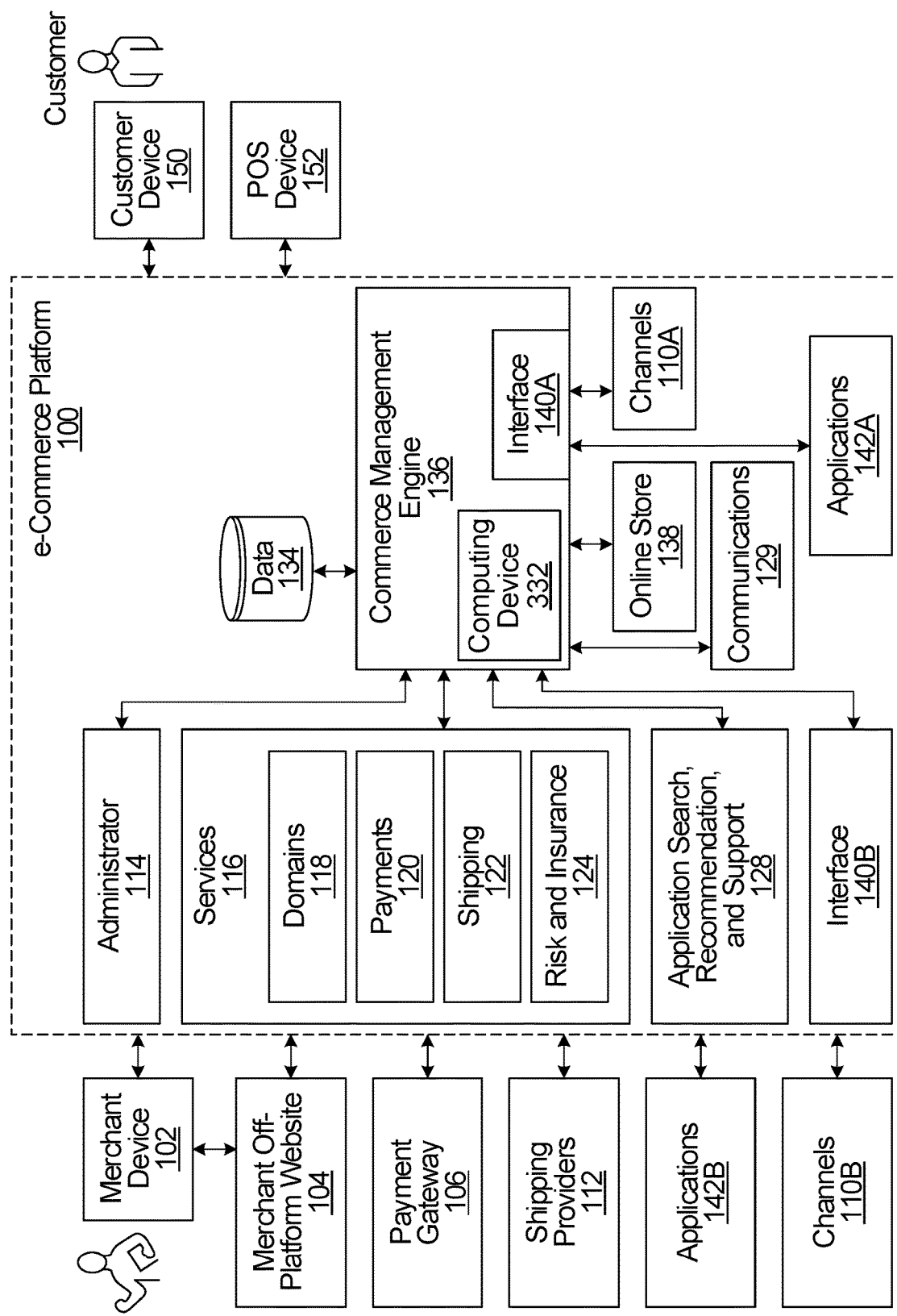
FIG. 17 illustrates the e-commerce platform of FIG. 15, but including the computing device of FIG. 1.

FIG. 17 illustrates the e-commerce platform 100 of FIG. 15, but with the addition of computing device 332. The computing device 332 is that shown in FIG. 1. The computing device 332 may communicate with a display device 302, such as a headset, to perform the methods described herein. Although the computing device 332 is illustrated as a distinct component of the commerce management engine 136 of e-commerce platform 100 in FIG. 17, this is only an example. The computing device 332 could also or instead be provided by another component residing within or external to the e-commerce platform 100. In some embodiments, either or both of the applications 142A-B implement the operations of the computing device 332 that is available to customers and/or to merchants.

In some embodiments, at least a portion of the system 300 described in relation to FIG. 1 may be implemented in the merchant device 102 and/or in the customer device 150. For example, the customer device 150 may be or include the display device 302.

Although the embodiments described above may be implemented in association with an e-commerce platform, such as (but not limited to) the e-commerce platform 100, the embodiments described are not limited to the specific e-commerce platform 100 of FIGS. 15 to 17. Further, the embodiments described herein do not necessarily need to be implemented in association with or involve an e-commerce platform at all.

CONCLUSION

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The invention claimed is:

1. A computer-implemented method comprising:
    generating a user interface for presentation on a display, the user interface overlaid onto a view rendered on the display;
    performing eye tracking to detect a gaze depth of a gaze of a human viewing the display; and
    modifying the user interface responsive to a change in the gaze depth,
    wherein the gaze depth that is detected before the change in the gaze depth is an initial gaze depth, and wherein modifying the user interface responsive to the change in the gaze depth comprises:
        determining a duration of time during which the gaze depth remains changed compared to the initial gaze depth; and
        modifying the user interface responsive to the duration of time exceeding a threshold.

2. The computer-implemented method of claim 1, wherein at least part of the user interface is semi-transparent to show both the user interface and at least part of the view over which the user interface is overlaid.

3. The computer-implemented method of claim 1, wherein modifying the user interface responsive to the change in gaze depth comprises:
    modifying the user interface to be less visually prominent responsive to the gaze depth increasing.

4. The computer-implemented method of claim 3, wherein modifying the user interface to be less visually prominent comprises at least one of:
    increasing transparency of the user interface;
    reducing a size of the user interface;
    moving the user interface;
    moving content on the user interface; or
    reducing an amount or size of content on the user interface.

5. The computer-implemented method of claim 3, further comprising:
    displaying a visual focusing aid associated with a decreased gaze depth; and
    modifying the user interface to be more visually prominent responsive to the gaze depth subsequently changing to the decreased gaze depth associated with the focusing aid.

6. The computer-implemented method of claim 1, wherein modifying the user interface responsive to the change in gaze depth comprises:
    modifying the user interface to be more visually prominent responsive to the gaze depth decreasing.

7. The computer-implemented method of claim 6, wherein modifying the user interface to be more visually prominent comprises at least one of:
    decreasing transparency of the user interface;
    enlarging a size of the user interface;
    moving the user interface;
    moving content on the user interface; or
    increasing an amount or size of content on the user interface.

8. The computer-implemented method of claim 6, further comprising modifying at least part of the view rendered on the display to make the view less visually prominent.

9. The computer-implemented method of claim 1, wherein modifying the user interface responsive to the change in gaze depth comprises modifying the user interface to be less visually prominent responsive to the gaze depth increasing and modifying the user interface to be more visually prominent responsive to the gaze depth decreasing.

10. The computer-implemented method of claim 1, wherein modifying the user interface responsive to the change in gaze depth comprises changing content displayed on the user interface.

11. The computer-implemented method of claim 10, wherein the changed content is also based on a direction of the gaze.

12. The computer-implemented method of claim 1, further comprising:
    determining a direction of gaze;
    determining, based on the gaze depth and the direction of gaze, that the human is viewing a particular item rendered on the display; and
    responsive to the determining that the human is viewing the particular item, modifying the user interface.

13. The computer-implemented method of claim 1, wherein detecting the gaze depth of the gaze comprises:
    determining a first vector representing a gaze direction of a left eye;
    determining a second vector representing a gaze direction of a right eye; and
    determining the gaze depth based on convergence of the first vector and the second vector.

14. A system comprising:
    at least one processor; and
    a memory storing processor-executable instructions that, when executed, cause the at least one processor to:
        generate a user interface for presentation on a display, the user interface overlaid onto a view rendered on the display;
        perform eye tracking to detect a gaze depth of a gaze of a human viewing the display; and
        modify the user interface responsive to a change in the gaze depth,
        wherein the gaze depth that is detected before the change in the gaze depth is an initial gaze depth, and wherein the at least one processor is to modify the user interface responsive to the change in the gaze depth by performing operations comprising:

determining a duration of time during which the gaze depth remains changed compared to the initial gaze depth; and modifying the user interface responsive to the duration of time exceeding a threshold.

15. The system of claim 14, wherein at least part of the user interface is semi-transparent to show both the user interface and at least part of the view over which the user interface is overlaid.

16. The system of claim 14, wherein the at least one processor is to modify the user interface responsive to the change in gaze depth by modifying the user interface to be less visually prominent responsive to the gaze depth increasing.

17. The system of claim 14, wherein the at least one processor is to modify the user interface responsive to the change in gaze depth by modifying the user interface to be more visually prominent responsive to the gaze depth decreasing.

18. The system of claim 14, wherein the at least one processor is to modify the user interface responsive to the change in gaze depth by changing content displayed on the user interface.

19. The system of claim 14, wherein the processor-executable instructions, when executed, further cause the at least one processor to:

determine a direction of gaze;

determine, based on the gaze depth and the direction of gaze, that the human is viewing a particular item rendered on the display; and responsive to the determining that the human is viewing the particular item, modify the user interface.

20. A non-transitory computer-readable storage medium having stored thereon computer-executable instructions that, when executed by at least one processor, cause the at least one processor to perform operations comprising:

generating a user interface for presentation on a display, the user interface overlaid onto a view rendered on the display;

performing eye tracking to detect a gaze depth of a gaze of a human viewing the display; and modifying the user interface responsive to a change in the gaze depth, wherein the gaze depth that is detected before the change in the gaze depth is an initial gaze depth, and wherein modifying the user interface responsive to the change in the gaze depth comprises:

determining a duration of time during which the gaze depth remains changed compared to the initial gaze depth; and modifying the user interface responsive to the duration of time exceeding a threshold.

21. The non-transitory computer-readable storage medium of claim 20, wherein at least part of the user interface is semi-transparent to show both the user interface and at least part of the view over which the user interface is overlaid.

* * * * *